(12) United States Patent
Kramer et al.

(10) Patent No.: US 10,261,528 B2
(45) Date of Patent: Apr. 16, 2019

(54) WIRELESS THERMOSTAT AND SYSTEM

(71) Applicant: Blue Radios, Inc., Englewood, CO (US)

(72) Inventors: Mark Kramer, Castle Rock, CO (US);
Wilfred Tucker, Centennial, CO (US);
John Sample, Centennial, CO (US);
Christopher Bermel, Denver, CO (US)

( * ) Notice: Subject to any disclaimer, the term of this patent is extended or adjusted under 35 U.S.C. 154(b) by 321 days.

(21) Appl. No.: 14/171,838

(22) Filed: Feb. 4, 2014

(65) Prior Publication Data

US 2014/0217186 A1 Aug. 7, 2014

Related U.S. Application Data

(60) Provisional application No. 61/760,205, filed on Feb. 4, 2013.

(51) Int. Cl.
*G05D 23/19* (2006.01)
(52) U.S. Cl.
CPC ................................ *G05D 23/1905* (2013.01)
(58) Field of Classification Search
CPC .................................................. G05D 23/1905
USPC ..................... 236/78 R, 1 C; 340/521; 726/1
See application file for complete search history.

(56) References Cited

U.S. PATENT DOCUMENTS

| | | | | |
|---|---|---|---|---|
| 4,188,604 A | * | 2/1980 | Maybee | H01H 37/16 236/68 B |
| 5,087,794 A | * | 2/1992 | Nelson | H05K 5/0208 174/547 |
| 5,485,954 A | * | 1/1996 | Guy | G05D 23/1904 236/46 R |
| 5,833,134 A | | 11/1998 | Ho et al. | |
| 5,927,599 A | | 7/1999 | Kath | |
| 6,116,512 A | | 9/2000 | Dushane et al. | |
| 6,196,467 B1 | | 3/2001 | Dushane et al. | |
| 6,508,407 B1 | | 1/2003 | Lefkowitz et al. | |
| 6,619,055 B1 | | 9/2003 | Addy | |
| 6,798,341 B1 | * | 9/2004 | Eckel | G01K 1/045 340/12.32 |
| 6,902,117 B1 | | 6/2005 | Rosen | |
| 7,454,269 B1 | * | 11/2008 | Dushane | G05D 23/1902 700/276 |
| 7,565,813 B2 | | 7/2009 | Pouchak | |
| 7,571,865 B2 | | 8/2009 | Nicodem et al. | |
| 8,145,361 B2 | | 3/2012 | Forbes, Jr. et al. | |
| 8,280,536 B1 | | 10/2012 | Fadell et al. | |
| 2007/0019804 A1 | * | 1/2007 | Kramer | A45C 11/00 379/433.13 |
| 2007/0023533 A1 | * | 2/2007 | Liu | F24F 11/30 236/1 C |

(Continued)

*Primary Examiner* — Henry T Crenshaw
(74) *Attorney, Agent, or Firm* — Gearhart Law, LLC

(57) ABSTRACT

A secure wireless thermostat and system comprising the thermostat are described and taught. The temperature control unit replaces the traditional thermostat by attaching to the wall and using the existing wiring from the traditional thermostat. This temperature control unit has no display or programming buttons, rather a user interacts with the temperature control unit via electronic devices such as smart phones, laptop computers, and desktop computers. The settings of the system can be modified by the user from these access ports. If the user opts to interact with the system via a third party IP server, a local DHCP web server can be employed to store data safely and securely.

7 Claims, 5 Drawing Sheets

(56) References Cited

U.S. PATENT DOCUMENTS

| | | | |
|---|---|---|---|
| 2009/0077624 A1* | 3/2009 | Baum | G08B 25/14 |
| | | | 726/1 |
| 2009/0243869 A1* | 10/2009 | Sanderford, Jr. | G01D 4/002 |
| | | | 340/657 |
| 2010/0081375 A1* | 4/2010 | Rosenblatt | G08C 17/02 |
| | | | 455/41.1 |
| 2010/0301991 A1* | 12/2010 | Sella | G08B 13/1409 |
| | | | 340/3.1 |
| 2011/0070829 A1* | 3/2011 | Griffin | H04B 5/02 |
| | | | 455/41.1 |
| 2011/0238222 A1* | 9/2011 | Nikovski | F24F 11/006 |
| | | | 700/276 |
| 2012/0010758 A1* | 1/2012 | Francino | G05B 17/02 |
| | | | 700/291 |
| 2012/0123594 A1 | 5/2012 | Finch et al. | |
| 2014/0217186 A1* | 8/2014 | Kramer | G05D 23/1905 |
| | | | 236/1 C |

* cited by examiner

WIRELESS THERMOSTAT AND SYSTEM

CLAIM OF PRIORITY

This application claims priority to U.S. Application Ser. No. 61/760,205 filed on Feb. 4, 2013, the contents of which are herein incorporated by reference in its entirety.

FIELD OF THE INVENTION

The field of the present invention relates to a wireless temperature control system which controls a heating, ventilation, and air conditioning (HVAC) unit with added security features and is capable of remote off-board learning intelligence.

BACKGROUND OF THE INVENTION

HVAC units are used to control climates within closed spaces, and most often living spaces. These units, or systems, typically contain at least one thermostat hard wired to the system. In recent years, the trend has been to incorporate wireless thermostats into these systems. These wireless thermostats provide flexibility within the system and greater user control.

However, depending on the location of the system free access to these thermostats is not necessarily desirable or placed in optimal locations. The location of these thermostats is vital to accurately measuring the average room temperature. Additionally, advances in technology have created intelligent thermostats capable of employing built in learning algorithms over numerous complex sensors. These advances have also led to the advent of expensive touch capacitance screens increasing the overall cost of the unit to produce and operate, as well as a more finite control per temperature zone.

Previous attempts to solve this problem have resulted in unsightly covers and locking mechanisms to prevent manipulation of the system. These aftermarket attachments often are bulky and use a key to gain access to the system. Thus, the loss or misplacing of a key results in a loss of access to the system.

Additionally, some systems display the temperature for a given area, but this may not represent the temperature for the complete coverage area of the systems (i.e. one room in a house). This result is brought forward due to different rooms, offices, etc. being located in different designated climate zones. The inability to observe each specific temperature results in constant manipulation of the system in an attempt to achieve the desired results.

With the advent of the smart phone as a common graphical user interface controller, the standard thermostat command and control learning activities can be shifted directly to the user. This creates a thermostat of a much simpler design and provides added efficiency and control to the HVAC unit as a whole. In turn, by using a smart phone as a common graphical user interface controller, one can remove the programming buttons and display from the wall unit preventing others from accessing and manipulating the system.

REVIEW OF RELATED TECHNOLOGY

U.S. Pat. No. 7,175,865 describes an apparatus such as a wireless temperature control system or a method for controlling an HVAC unit from a central location that may include a control transmitter for sending programming data. One or more thermostats, each wired to an associated HVAC unit or units, have a wireless component for receiving the programming data from the control transmitter via a localized wireless network. The one or more thermostats of the system are not dependent upon the control transmitter or the localized wireless network for continued operation. Using this apparatus or method, a user may, among other things, transmit programming data to one or more HVAC units from one central location.

U.S. Pat. No. 7,454,269 describes a programmable thermostat comprising an intuitive algorithm embodiment. In said intuitive algorithm embodiment, a programmable thermostat that operates under control of a control program incorporating an intuitive algorithm. The intuitive algorithm allows a user to change the modes and set points of a programmable thermostat without need to refer to a display of currently effective operational modes, set points, or environmental sensor inputs. While a user may prefer to observe said display, the intuitive algorithm eliminates the need to do so.

U.S. Pat. No. 6,902,117 describes systems and methods using a wireless sensor for wirelessly transmitting a temperature signal to a programmable thermostat without intervening digital storage. A temperature circuit comprises a temperature sensor whose resistance changes with temperature and one or more reactive components. The temperature is inferred at the receiver from the time elapsed between reception of the various coded pulses that indicate activity within the transmitter.

U.S. Patent Application 2012/0123594 describes a system comprising memory configured to store a temperature value based on a cost of a given energy resource, wherein the cost-based temperature value differs from a temperature value based on a temperature schedule. The system also comprises a controller operatively coupled to the memory and configured to compare the cost-based temperature value to the schedule-based temperature value, and to direct one of a cooling system and a heating system to maintain a temperature of an environment at the one of the cost-based temperature value and the schedule-based temperature value that results in an energy cost savings.

Various devices are known in the art. However, their structure and means of operation are substantially different from the present disclosure. In light of the aforementioned limitations, there is a need for an improvement to the field to combat these issues. The known devices are bulky and do not have sufficient securement mechanisms. The other inventions also fail to solve all the problems taught by the present disclosure. At least one embodiment of this invention is presented in the drawings below and will be described in more detail herein.

SUMMARY OF THE INVENTION

The present invention comprises a temperature control unit. The temperature control unit comprises an exterior casing. The exterior casing comprises an upper and lower half. Within the exterior casing, there is a printed circuit board, microcontroller unit, battery, temperature sensor, humidity sensor, and accelerometer. The temperature control unit may also have at least one light emitting diode. In some embodiments, the temperature control unit employs near field communication for wireless pairing as well as the accelerometer, which also permits wireless pairing and potentially theft notification. In operating in this wireless manner, the apparatus functions in accordance with the 2.4 GHz ISM radio band. Additionally, the temperature control unit affixes to a back plate, or wall mount. The wall mount screws into the wall where the wired thermostat was previously. The temperature control unit may further have a real time clock (RTC).

Another aspect of the present invention describes a temperature control system. The temperature control system employs the aforementioned temperature control unit operably connected to an HVAC system and in wireless communication with a smart phone. Through the touch sensitive capabilities of the smart phone, the settings of the HVAC system can be manipulated. The various settings, sensitivities, etc. are universal and integrated into a generic smart phone application and may change depending on the capabilities of the HVAC system. The smart phone can schedule and set the schedule for the HVAC system. This can be done automatically based on factors such as global positioning systems, electronic calendars, or short range wireless proximity to the thermostats.

In another embodiment of the temperature control system, there is a temperature control system comprising the aforementioned temperature control unit in communication with an existing HVAC system. Additionally, the system could communicate with a wired or wireless internet device such as a desktop computer. In this embodiment, a local DHCP web server is employed for security purposes. The system can function and be accessed as a standalone system or through cloud based means. Additionally, the schedule can be created and set automatically based on global positioning systems, electronic calendars, and wireless short range proximity to the thermostat.

In general, the present invention succeeds in conferring the following, and others not mentioned, benefits and objectives.

It is an object of the present invention to provide a wireless thermostat system that can interact with a smart phone, laptop, PDA, or other similar electronic device.

It is an object of the present invention to provide a wireless thermostat that can be attached to existing HVAC systems quickly and effectively.

It is an object of the present invention to provide a wireless thermostat that can be remotely monitored and accessed.

It is an object of the present invention to provide a wireless thermostat that prevents unauthorized access or manipulation of the thermostat system.

It is an object of the present invention to provide a wireless thermostat that can interact with electronic calendars, weather reports, and the like to change the internal environment.

It is an object of the present invention to provide a wireless thermostat system employing a DHCP server for added security.

It is another object of the present invention to provide a wireless thermostat that is small and secure.

It is another object of the present invention to provide a secure wireless thermostat that does not require a key for access.

It is yet another object of the present invention to provide a wireless thermostat system that effectively measures the temperature of all required areas.

BRIEF DESCRIPTION OF DRAWINGS

Embodiments of the present invention will now be described, by way of example only, with reference to the accompanying drawings, in which.

DETAILED DESCRIPTION OF THE DRAWINGS

Figure 1:
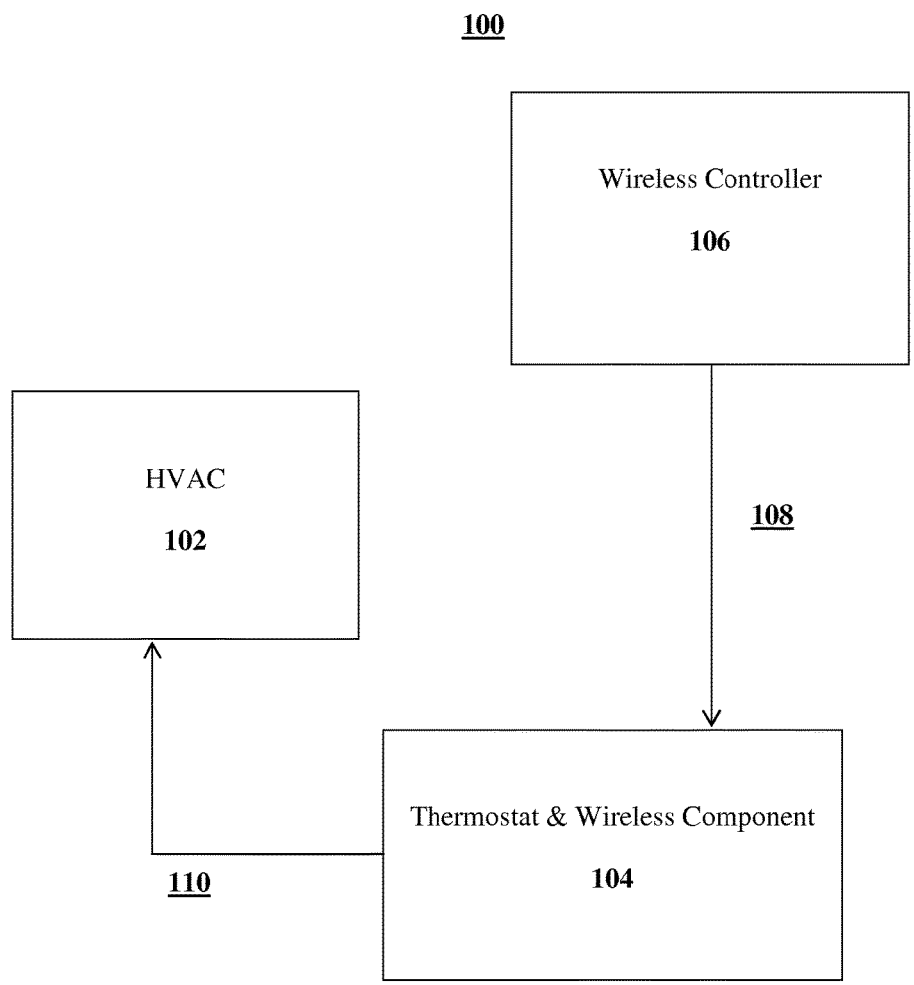
FIG. 1 is an illustration of a prior art wireless thermostat system.

The preferred embodiments of the present invention will now be described with reference to the drawings. Identical elements in the various figures are identified, as far as possible, with the same reference numerals. Reference will now be made in detail to embodiments of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto without deviating from the innovative concepts of the invention.

Referring to the drawings, FIG. 1 demonstrates the general prior art involving wireless thermostats. The wireless thermostat system 100 generally comprises three main parts: a wireless controller 106, a thermostat and wireless component 104, and a HVAC unit 102.

The wireless controller 106 sends various programming control data via a localized wireless network 108 to the thermostat and wireless component 104. In this scenario, the wireless controller 106 may take many forms as one skilled in the art would appreciate and includes those devices that communicate in the radio frequency spectrum. The wireless network 108 may be a number on wireless networks including but not limited to Bluetooth®, Wi-Fi, or ZigBee.

The thermostat and wireless component 104 is wired 110 to a HVAC unit 102. The programmable functions or data transmitted to the thermostat and wireless component 104 then transmits the directive to the HVAC unit 102. It is important to note that the wireless controller 106 is not necessary for the functionality of the system 100.

Figure 2:
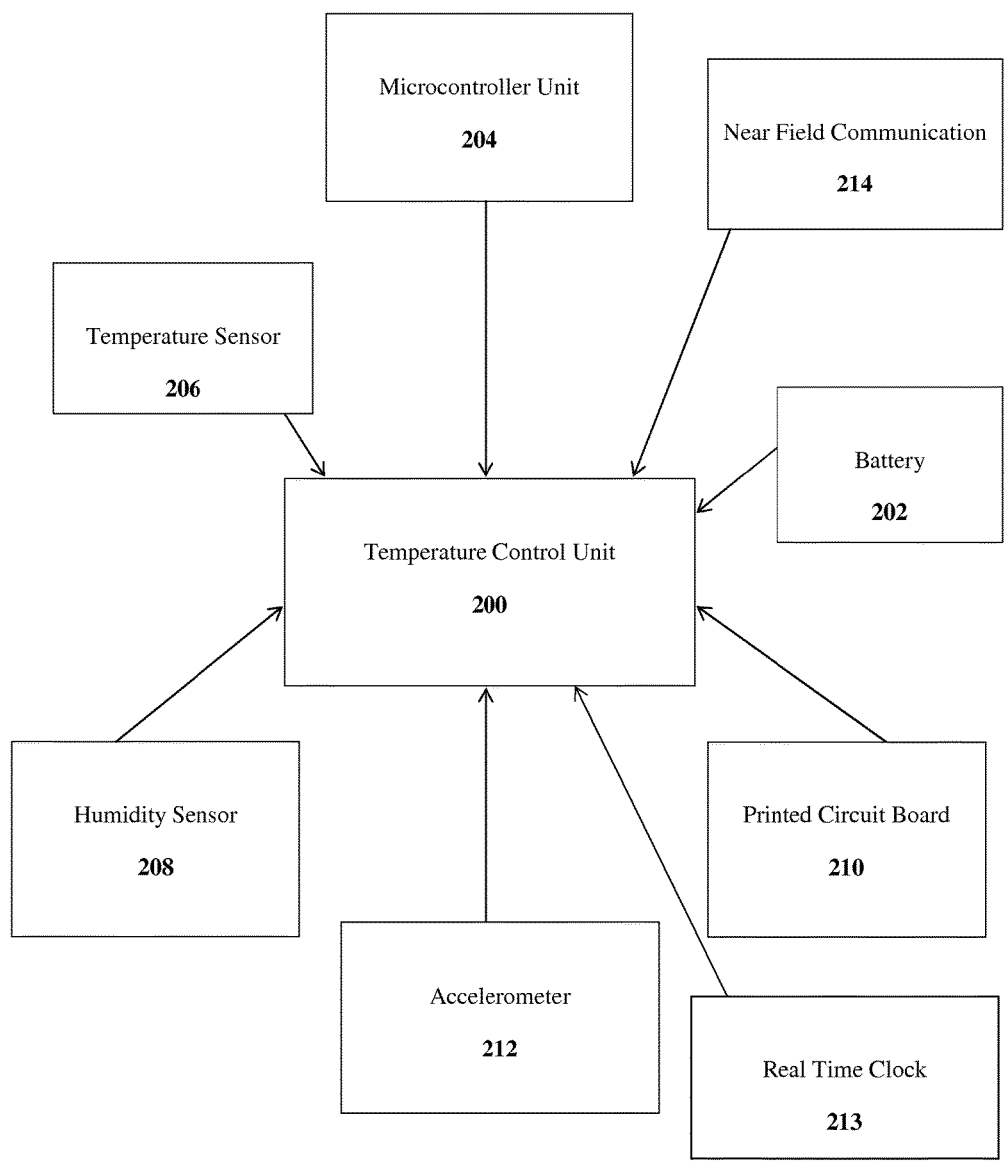
FIG. 2 demonstrates the interior components of a preferred embodiment of the present invention.

FIG. 2 illustrates the internal components of a preferred embodiment according to this invention of the described temperature control unit 200. These components are not meant to be exhaustive and those skilled in the art will realize that a number of combinations of these components may exist, as well as the possibility of inclusion of different, but similar components. The temperature control unit 200 contains a temperature sensor 206. This is preferably a digital sensor that is capable of a wide range of temperatures as well as minute differences in temperature. Likewise, the temperature control unit 200 contains a humidity sensor 208. Again, it is preferable to have a digital humidity sensor 208 that has extensive range capabilities as well as the ability to process fine point adjustments.

The temperature control unit 200 may also have an accelerometer 212 for pairing and/or support near field communications 214. The accelerometer 212 is preferably a 3-axis digital accelerometer. The accelerometer 212 acts as to recognize a "bump" or vibration between devices. This permits wireless pairing between a temperature control unit 200 and a smart phone or gateway device 306 or other similarly situated device (see FIG. 3). In the same breath, near field communications 214 or NFC, as well as radio frequency (RF) proximity using low energy Bluetooth®, may be employed to achieve the same result. In this embodiment, physical contact is not required between the two devices for pairing. In either scenario, safeguards may be put in place to prevent certain devices from pairing with the temperature control unit 200. Further, the present invention may have a real time clock (RTC) 213. The real time clock 213 keeps an accurate, real time and enables the system to interact with and know the specific time for various functionalities or programs to occur. The real time clock 213 also has a minimal power consumption compared to other potential time keeping methodologies.

The heart of the temperature control unit 200 is the battery 202, microcontroller unit 204, and printed circuit board 210. The printed circuit board 210 has, amongst other components, at least one and preferably two terminal screws. The microcontroller unit 204 is the computing driving force behind the programmable input/output peripherals of which the temperature controller unit 200 is capable. It also provides the memory for the unit 200 to store and remember certain settings or predetermined schedules as set by the user. The battery 202 may be a standard lithium-ion battery or a thin film lithium-ion battery or a similar type battery or some combination thereof.

Figure 3:
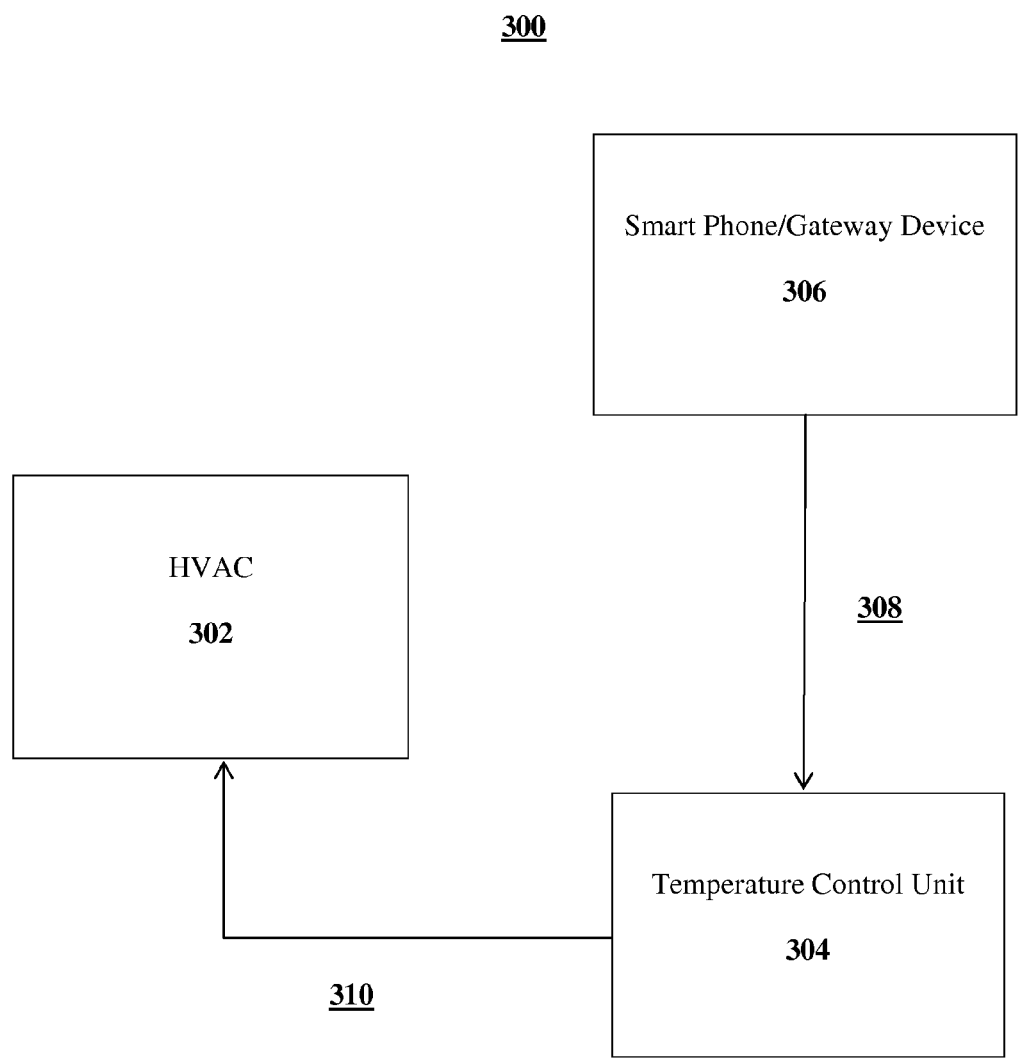
FIG. 3 is a diagram demonstrating the present invention employed in a systematic use.

FIG. 3 demonstrates a preferred embodiment of the temperature control system 300 employing a temperature control unit 304. The diagram as displayed is not meant to be the only iteration of the connection of the devices, as other modes of connection may exist. The temperature control unit 304 replaces the traditional thermostat in the temperature control system 300. The temperature control unit 200 installs into the wall and on the existing system wiring (see FIG. 5). Here, a user employs a smart phone 306 to interact with the temperature control unit 304. The interface of the smart phone 306, by way of a generic smart phone application, takes the form of the former traditional thermostat unit. The universal nature of the application means that not all functionality may be available or necessary depending on the associated HVAC unit and its capabilities. These capabilities may include heat, cool, fan, and specific temperature settings. The touch-sensitive buttons of the application are customizable to provide a custom experience.

Additionally, the user may be able to use voice prompts in order to wirelessly send programming data to the temperature control unit 304. These prompts may include the user saying "heat on/off" or "temperature X°." These prompts either manually input or spoken are sent via wireless signal 308 to the temperature control unit 304. This wireless signal 308 may include the standards for a number of wireless protocols including but not limited to Bluetooth®, Wi-Fi, and ZigBee. Additionally, the smart phone 306 may set or create schedules automatically for the HVAC system. This is achieved through the smart phone 306 accessing and interacting with global positioning systems, electronic travel calendars, measuring short range wireless proximity to the thermostat(s), and web based data such as weather patterns and traffic delays. These settings can be learned based on user preferences, location of the user, season, and outdoor weather conditions. Ideally, point to point communications are used in conjunction with the smart phone 306 but it is not required by the system 300.

The temperature control unit 304 has a wired connection 310 to the HVAC unit 302. This wired connection 310 is used to send programming and other data including temperature set points from the temperature control unit 304. Additionally, in some embodiments, the temperature control unit 304 may communicate wirelessly with the HVAC unit 302.

Figure 4:
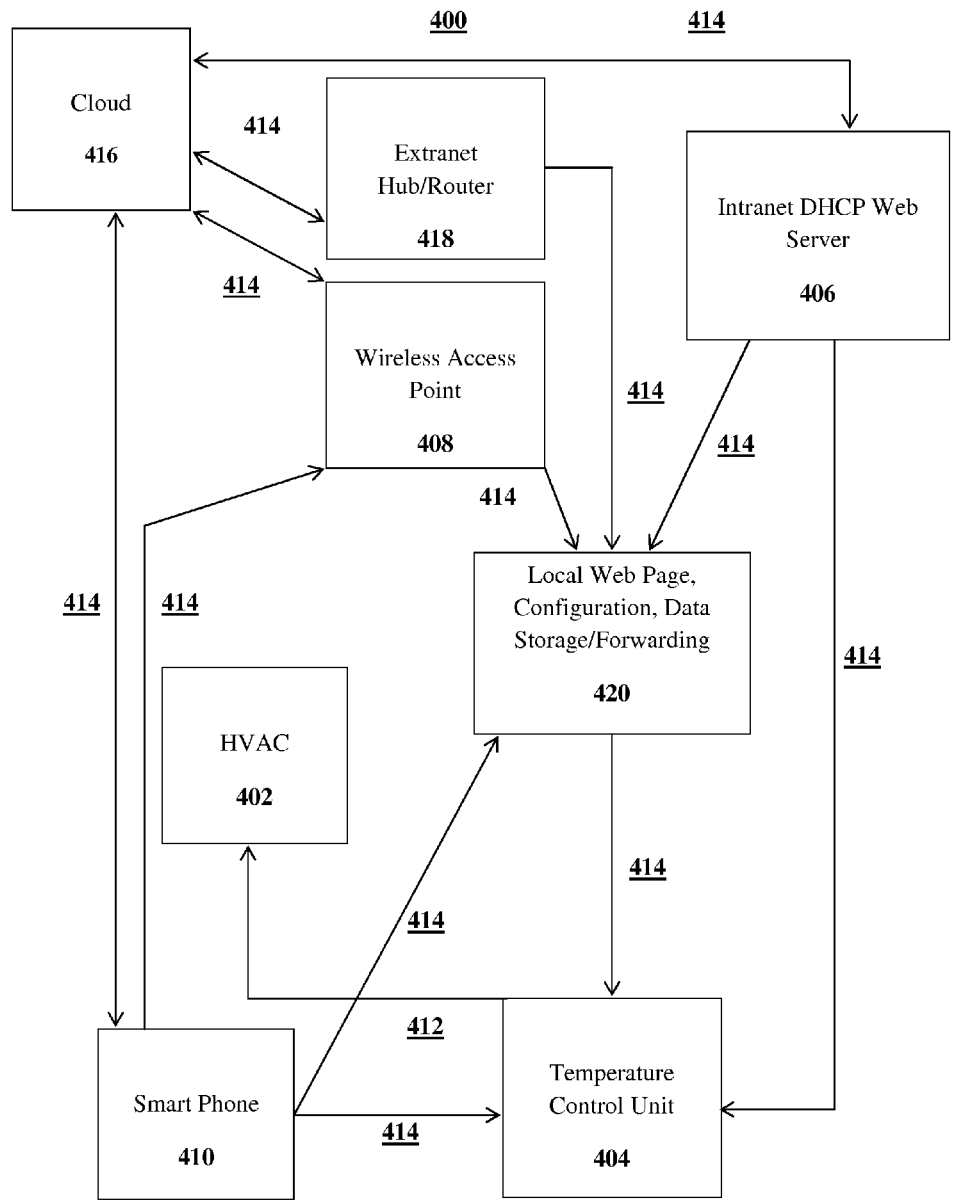
FIG. 4 is a diagram demonstrating the present invention in systematic use employing a local DHCP web server.

FIG. 4 is a diagram illustrating an alternate embodiment of a temperature control system 400 employing a secure, local DHCP web server 406. Again, the connections shown in this diagram are not exclusive and other iterations may exist. In this embodiment, the user can access the system 400 from a remote wireless access point 408, through cloud based means 416 or an extranet hub/router 418.

The wireless access point 408 and DHCP web server 406 may be a number of wireless devices including laptop computers, PDAs, gaming devices, desktop computers, and tablet devices amongst others. From the wireless access point 408 or any of the aforementioned access points, the user may manipulate the temperature control unit 404 via a wireless signal 414 as described above (see FIG. 3). The wireless signal 414 may comprise those signals typically associated with wireless signals 414 in the art including Wi-Fi, Bluetooth®, ANT, and ZigBee. The temperature control unit 404 then sends a wired signal 412 to an associated HVAC unit 402. Additionally, the communication between the temperature control unit 404 and the HVAC unit 402 may be wireless in some embodiments as well. The user, in this scenario, can still use a smart phone 410 as a principle means of communication with the temperature control unit 404.

The inclusion of a local DHCP web server 406 provides added security if the user chooses to have a local intranet. For example, a company may, through their intranet system, have a local web page 420. This local web page 420 may have various data storage and forwarding capabilities. Additionally, there are ideally configurable options available through the local web page 420. These options as previously mentioned may include inputs such as "heat," "cool," and "fan." The access to the system through these means can be controlled via passwords and radio frequency identification (RFID) tags amongst others. The local web page 420 is not exclusive to commercial settings and can be used from a number of locations including the home and accessed from other wireless access points 408 and by way of an extranet hub/router 418.

In turn, the user can get information directly from the temperature control unit 404 or from an associated smart phone 410. The use of the local DHCP web server 406 does not interfere with the smart phone's 410 functionality with the system. Both can be used exclusively and mutually with one another on the same system.

Figure 5:
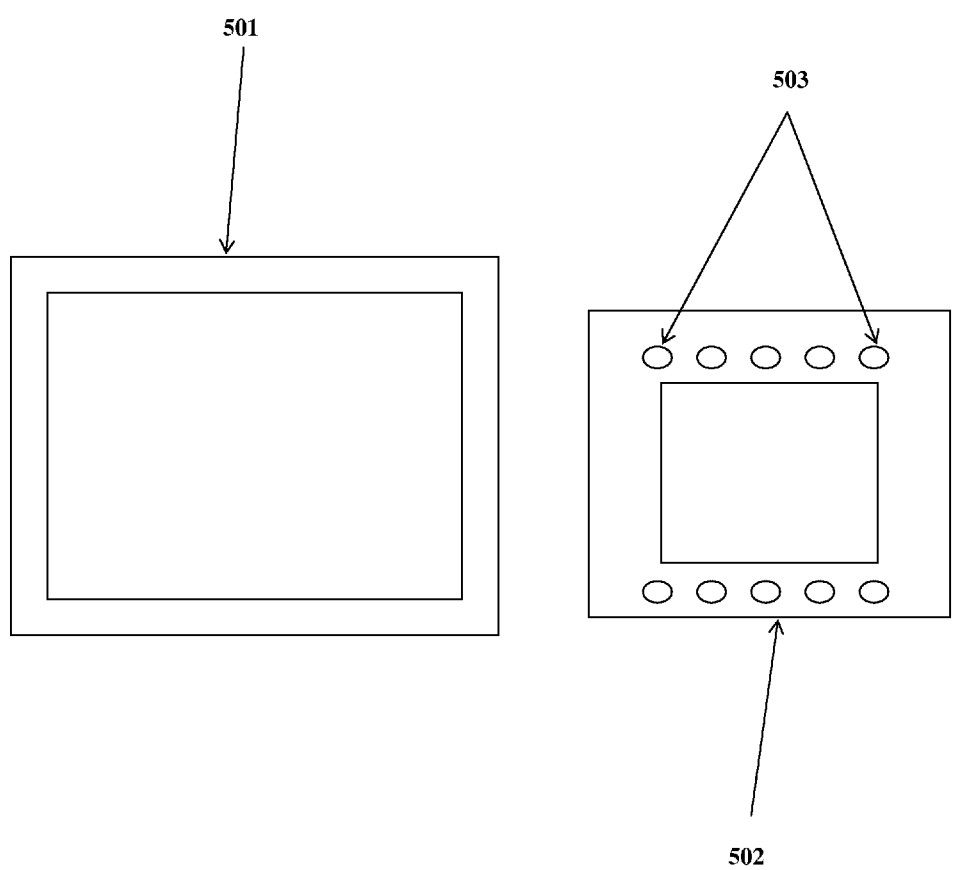
FIG. 5 is a representation of an embodiment of the temperature control unit and associated wall mount.

FIG. 5 represents the exterior of the temperature control unit 501. As previously stated, the exterior of the temperature control unit 501 has no display or programming buttons. It is a shell comprising at least an upper half and a lower half and contains the electronic components therein. This lends itself to the security features of the temperature control unit 501 in that it cannot be manipulated or operated without a proper device or clearance. The back plate 502 adheres to the temperature control unit 501. The back plate 502 has slots 503 for terminal screws to affix the back plate to an interior surface. The back plate 502 mounts to the wall and can be separated from the temperature control unit 501.

What is claimed is:
1. A temperature control unit consisting of:
   an exterior shell, the exterior shell comprising a first half configured to securely mate with a second half, the first half consisting of a continuous first surface and the second half being configured to couple to an existing wall;

a wall mounting bracket, wherein the wall mounting bracket attaches to the exterior shell via terminal screws; and a printed circuit board (PCB), a microcontroller unit (MCU), a battery, a temperature sensor, a humidity sensor, and an accelerometer contained within the exterior shell;

wherein the temperature control unit employs near field communication (NFC);

wherein settings of the temperature control unit are modified via a voice command input by a secondary electronic device in communicative connection with the temperature control unit;

wherein the temperature control unit is configured to send a theft notification to the secondary electronic device based on data collected by the accelerometer.

2. The temperature control unit of claim 1 wherein the temperature control unit operates over the 2.4 GHz industrial, scientific, and medical (ISM) radio band.

3. The temperature control unit of claim 1 wherein the temperature control unit operates as a wireless local area network device.

4. The temperature control unit of claim 1 wherein the printed circuit board has at least two terminal screws.

5. A control system comprising:
the temperature control unit of claim 1; and
a smart phone paired to the temperature control unit to enable automated and manual control of settings of the control system,
wherein authorization information must be exchanged between the smart phone and the temperature control unit,
wherein absence of the authorization information being exchanged will result in an unsuccessful pairing of the temperature control unit and the smart phone,
wherein the settings of the control system are modified via a voice command received by the smart phone,
wherein the smart phone is configured to receive a theft notification from the temperature control unit based on data collected by the accelerometer, wherein the smart phone is configured to enable manual control of the control system via an application running on the smart phone, and wherein the smart phone is configured to further automatically set a schedule of the system based on a combination of an electronic calendar, global positioning system, proximity position of the smart phone to the temperature control unit, and weather forecast.

6. The control system of claim 5 wherein settings of the system are configured to be manipulated via a touch sensitive screen of the smart phone.

7. A temperature control system consisting of:
a temperature control unit, the temperature control unit consisting of an exterior shell and having a printed circuit board (PCB), a microcontroller unit (MCU), a battery, a temperature sensor, a humidity sensor, and an accelerometer contained within the exterior shell,
wherein the exterior shell is affixed to a wall and consists of a static, continuous first surface, and
wherein the temperature control unit utilizes near field communications capabilities;
at least one smart phone paired to the control unit via a near field communications connection,
wherein the smart phone is configured to receive a theft notification from the temperature control unit based on data collected by the accelerometer,
wherein the smart phone is configured to enable manual control the temperature control system,
wherein authorization information must be exchanged between the smart phone and the control unit,
wherein absence of the authorization information being exchanged will result in an unsuccessful pairing of the control unit and the smart phone,
wherein settings of the control system are modified via a voice command received by the smart phone, and
wherein the smart phone is further configured to automatically modify a schedule of the system based on a combination of an electronic calendar, global positioning system, proximity position of the smart phone to the control unit, and weather forecast; and
a dynamic host configuration protocol (DHCP) server or wireless access point configured to provide system security and system access.

* * * * *